(12) United States Patent
Rugh et al.

(10) Patent No.: US 11,993,972 B2
(45) Date of Patent: May 28, 2024

(54) UNIVERSAL ROTARY ACTUATORS

(71) Applicant: Albany Magneto Equipment, Inc., Jefferson, OR (US)

(72) Inventors: Robert D. Rugh, Cottage Grove, OR (US); Luis Pavel Murillo Huerta, Azcapotzalco (MX)

(73) Assignee: Albany Magneto Equipment, Inc., Jefferson, OR (US)

( * ) Notice: Subject to any disclaimer, the term of this patent is extended or adjusted under 35 U.S.C. 154(b) by 251 days.

(21) Appl. No.: 17/686,846

(22) Filed: Mar. 4, 2022

(65) Prior Publication Data
US 2022/0282549 A1 Sep. 8, 2022

Related U.S. Application Data

(60) Provisional application No. 63/157,235, filed on Mar. 5, 2021.

(51) Int. Cl.
*E05F 15/00* (2015.01)
*E05F 15/649* (2015.01)
(Continued)

(52) U.S. Cl.
CPC .......... *E05F 15/649* (2015.01); *H02K 7/1166* (2013.01); *H02K 11/215* (2016.01); *H02K 11/27* (2016.01); *E05Y 2201/10* (2013.01); *E05Y 2201/214* (2013.01); *E05Y 2201/244* (2013.01); *E05Y 2201/434* (2013.01); *E05Y 2201/46* (2013.01); *E05Y 2201/474* (2013.01); *E05Y 2201/624* (2013.01); *E05Y 2201/686* (2013.01);
(Continued)

(58) Field of Classification Search
CPC ...... E05F 15/649; E05F 15/00; H02K 11/215; H02K 11/27; H02K 7/1166; E05Y 2201/10; E05Y 2201/214; E05Y 2201/244; E05Y 2201/434; E05Y 2201/46; E05Y 2201/474; E05Y 2201/624; E05Y 2201/686; E05Y 2201/702; E05Y 2201/704; E05Y 2201/716; E05Y 2400/36; E05Y 2400/40; E05Y 2400/44; E05Y 2400/52; E05Y 2900/132
See application file for complete search history.

(56) References Cited

U.S. PATENT DOCUMENTS 10,797,561 B2 * 10/2020 Shoda .................... H02K 29/08
11,047,433 B2 * 6/2021 Oguri ....................... H02K 7/14
(Continued)

*Primary Examiner* — Chi Q Nguyen
(74) *Attorney, Agent, or Firm* — Chernoff, Vilhauer, McClung & Stenzel, LLP

(57) ABSTRACT

Universal rotary actuators (URAs) and door assemblies having the URAs are disclosed. In some embodiments, the URA includes a motor, a worm gear driven by the motor, a worm wheel having teeth that mesh with threads of the worm gear, a pinion gear attached to the worm wheel, drive gear rotatably connected to the pinion gear, an output shaft attached to the drive gear, and a controller assembly disposed between the drive gear and the motor, the controller selectively controlling direction and speed of the motor. In some embodiments, the URA additionally includes a quick release assembly that moves the pinion gear between an engaged position in which the pinion gear is rotatably connected to the drive gear and a disengaged position in which the pinion gear is not rotatably connected to the drive gear.

21 Claims, 13 Drawing Sheets

(51) Int. Cl.
  *H02K 7/116*   (2006.01)
  *H02K 11/215*  (2016.01)
  *H02K 11/27*   (2016.01)

(52) U.S. Cl.
  CPC ... *E05Y 2201/702* (2013.01); *E05Y 2201/704* (2013.01); *E05Y 2201/716* (2013.01); *E05Y 2400/36* (2013.01); *E05Y 2400/40* (2013.01); *E05Y 2400/44* (2013.01); *E05Y 2400/52* (2013.01); *E05Y 2900/132* (2013.01)

(56) References Cited

U.S. PATENT DOCUMENTS

| | | | | |
|---|---|---|---|---|
| 11,569,708 B2* | 1/2023 | Kato | | H02K 5/22 |
| 2002/0011390 A1* | 1/2002 | Yamamoto | | F16D 43/02 |
| | | | | 192/38 |
| 2002/0158527 A1* | 10/2002 | Kawakami | | H02K 5/148 |
| | | | | 310/78 |
| 2007/0205680 A1* | 9/2007 | Miyoshi | | F16C 35/067 |
| | | | | 310/90 |
| 2012/0061200 A1* | 3/2012 | Yamashita | | F16D 3/02 |
| | | | | 192/45.001 |
| 2013/0015739 A1* | 1/2013 | Kastinger | | H02K 29/08 |
| | | | | 310/83 |
| 2013/0104682 A1* | 5/2013 | Schneider | | F16H 1/22 |
| | | | | 74/421 A |
| 2014/0232247 A1* | 8/2014 | Honda | | H02K 7/003 |
| | | | | 310/75 D |
| 2015/0108860 A1* | 4/2015 | Shibata | | H02K 7/116 |
| | | | | 310/71 |
| 2016/0149528 A1* | 5/2016 | Frampton | | H02P 9/302 |
| | | | | 322/20 |
| 2018/0034345 A1* | 2/2018 | Hirabayashi | | H02K 7/1166 |

* cited by examiner

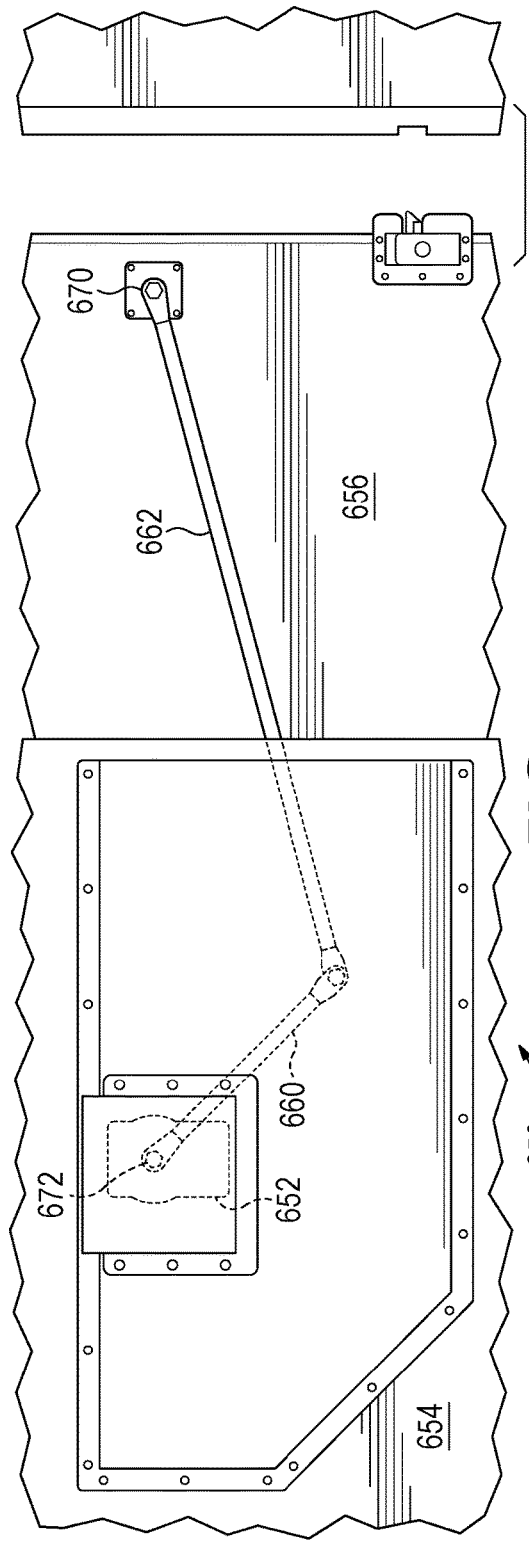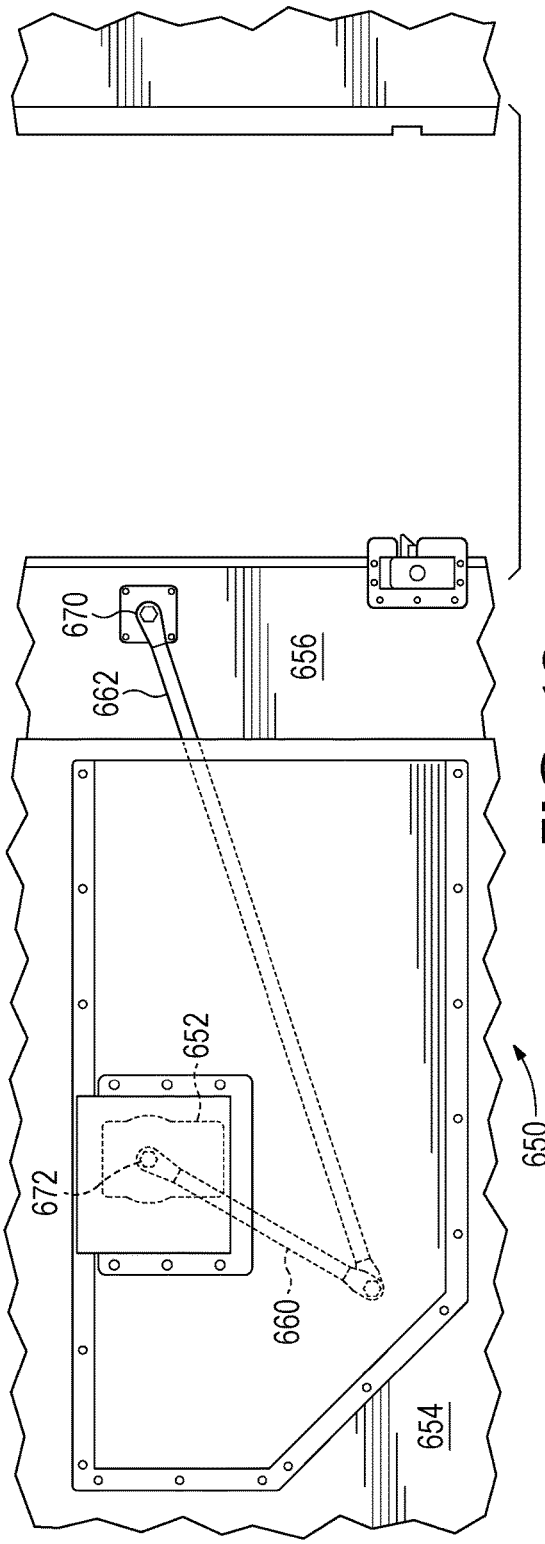

UNIVERSAL ROTARY ACTUATORS

CROSS-REFERENCE TO RELATED APPLICATIONS

This application claims the benefit of U.S. Provisional Patent Application Ser. No. 63/157,235 filed on Mar. 5, 2021 and entitled "Universal Rotary Actuator System with Controller." The complete disclosure of the above application is hereby incorporated by reference for all purposes.

BACKGROUND OF THE DISCLOSURE

Currently, a number of door opening systems and other similar systems in the prior art are based on a 110-1025 step extension gearbox and motor design. While the prior art gearbox is sufficient, the 110-1025 gearbox does not however have any internal control circuitry. Any control or actuation of the motor on this older design is exclusively external or nonexistent. While the 110-1025 gearbox offers a maximum mechanical range of motion, upon reaching its maximum range, the motor tends to stall out due to mechanical obstruction. As such, there is currently a need for an improved door opening mechanism which includes on-board controls and quick input/output response.

What is desired, therefore, is a universal rotary actuator (URA) having a smart electronic control that controls the motor of the URA and offers fine motor control features, such as control of motor rotation direction and speed.

BRIEF DESCRIPTION OF THE SEVERAL DRAWINGS

For a better understanding of the invention, and to show how the same may be carried into effect, reference will now be made, by way of example to the accompanying drawings, which:

FIGS. 16-18 are side views of the door assembly of FIG. 14 shown attached to a sliding door for opening and closing the door.

DETAILED DESCRIPTION OF THE DISCLOSURE

Figure 1:
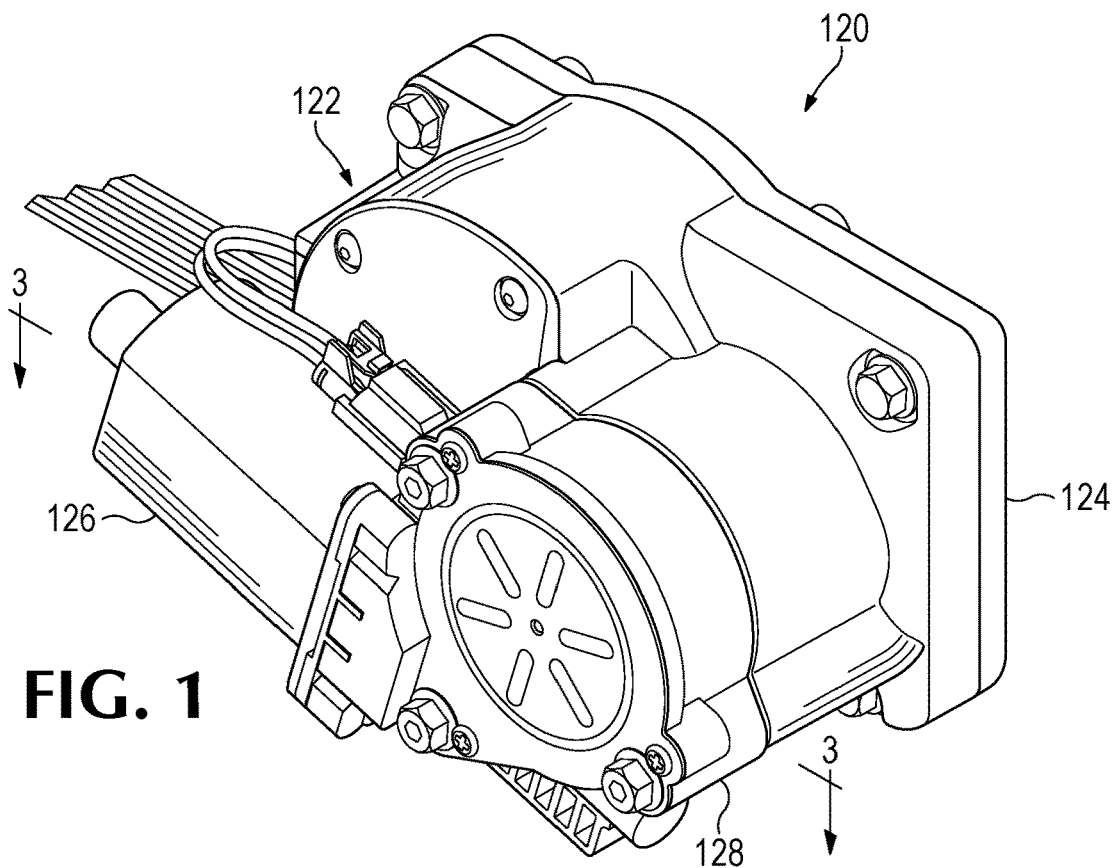
FIGS. 1-2 are isometric views of an example of a universal rotary actuator of the present disclosure.
Figure 2:
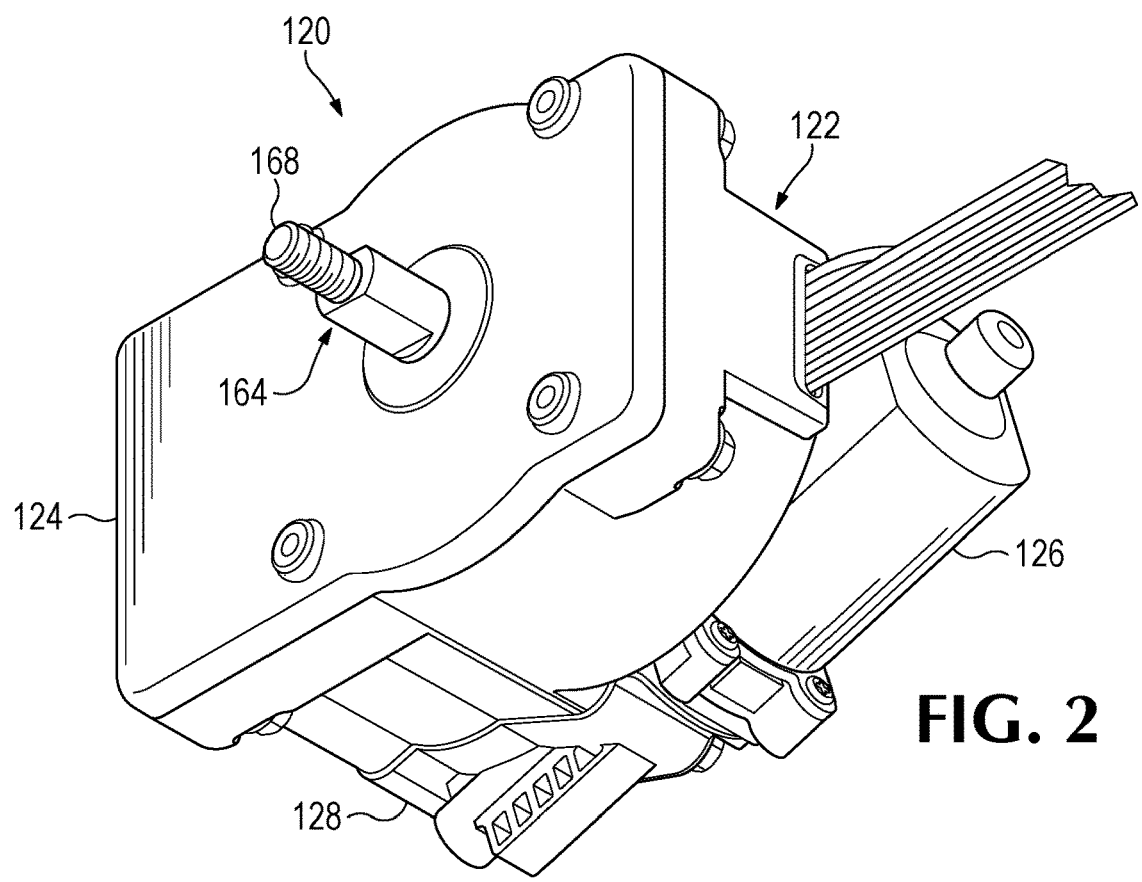
Figure 3:
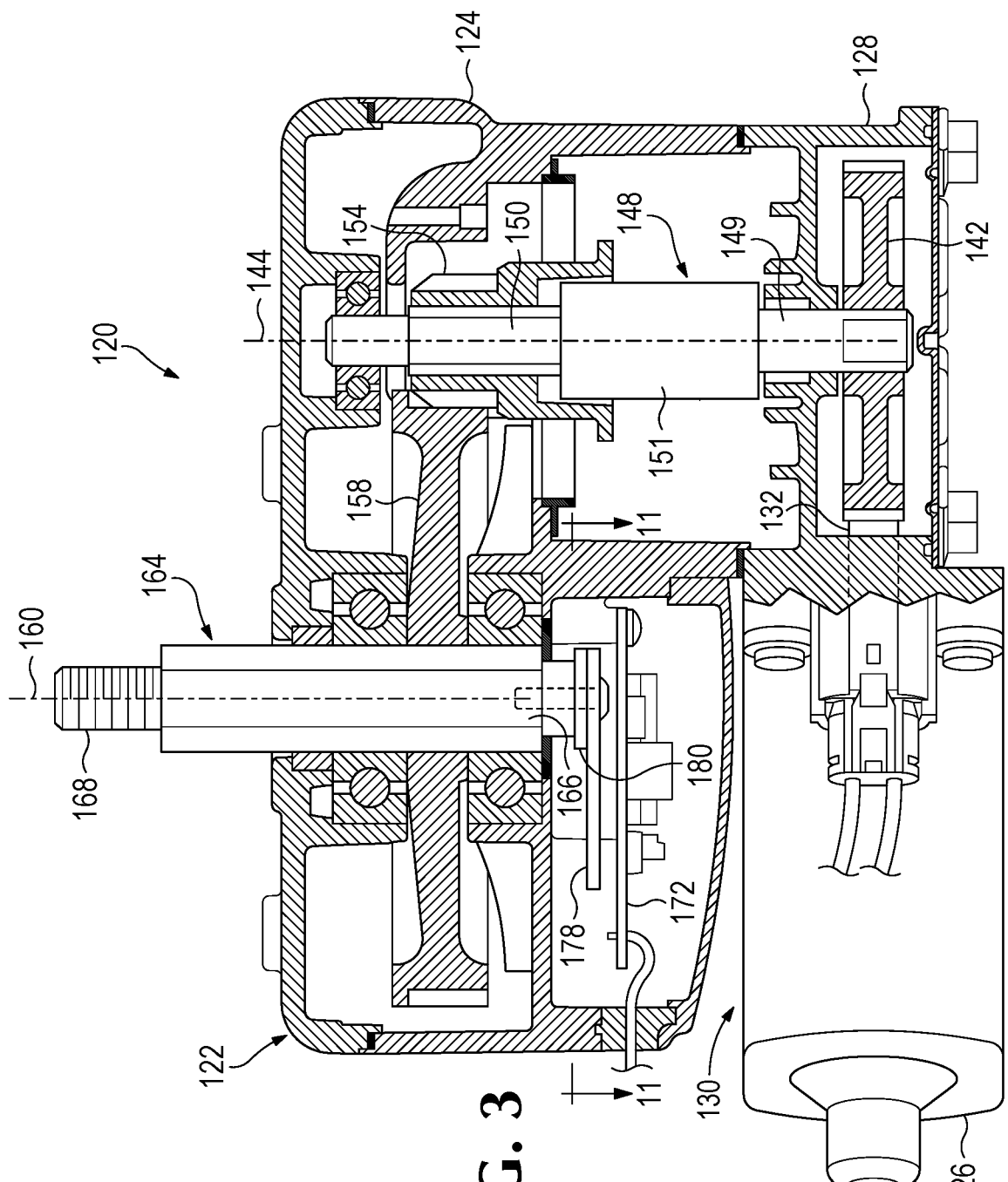
FIG. 3 is a sectional view of the universal rotary actuator of FIGS. 1-2 taken along lines 3-3 in FIG. 1.
Figure 4:
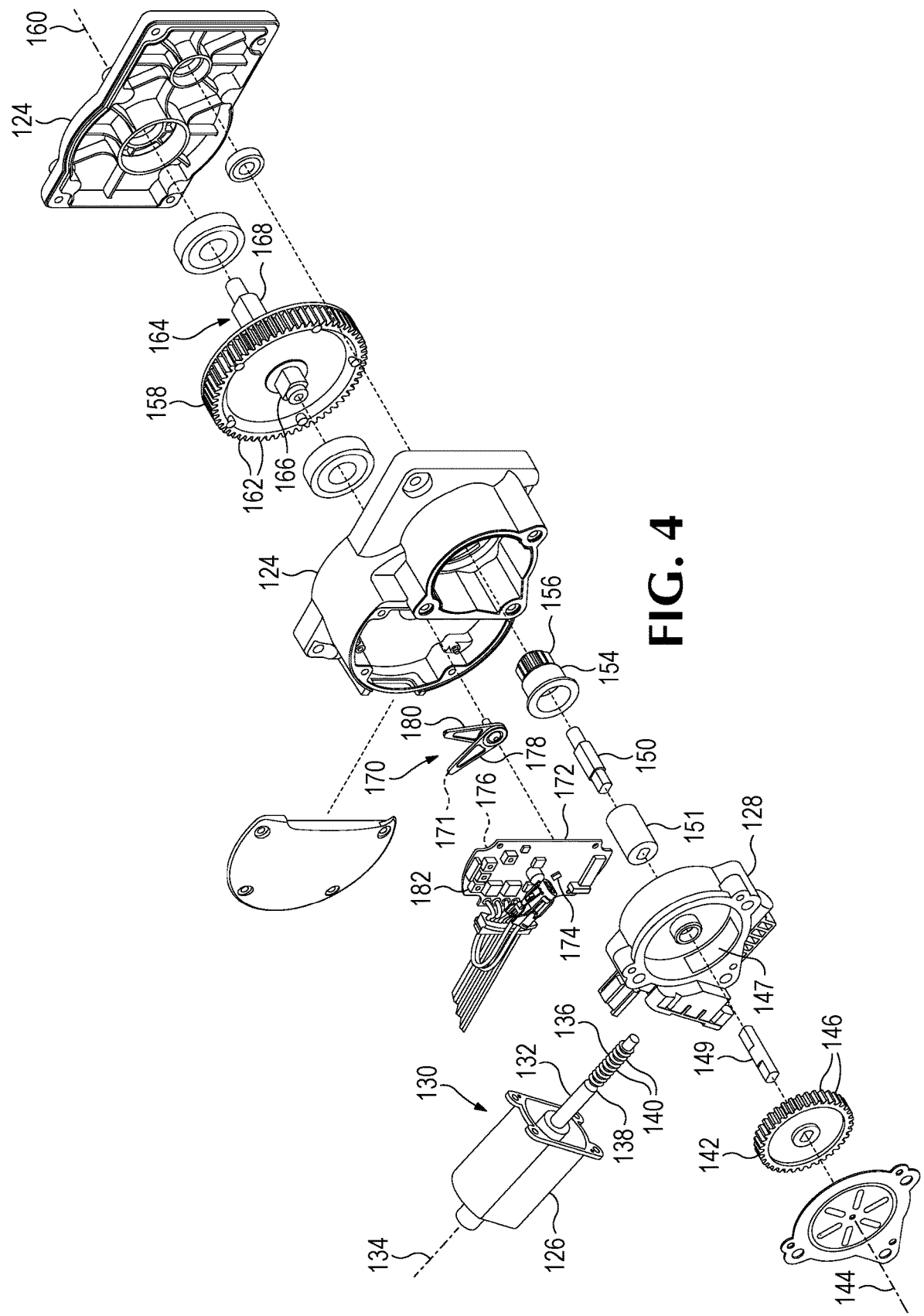
FIG. 4 is an exploded view of the universal rotary actuator of FIGS. 1-2.
Figure 5:
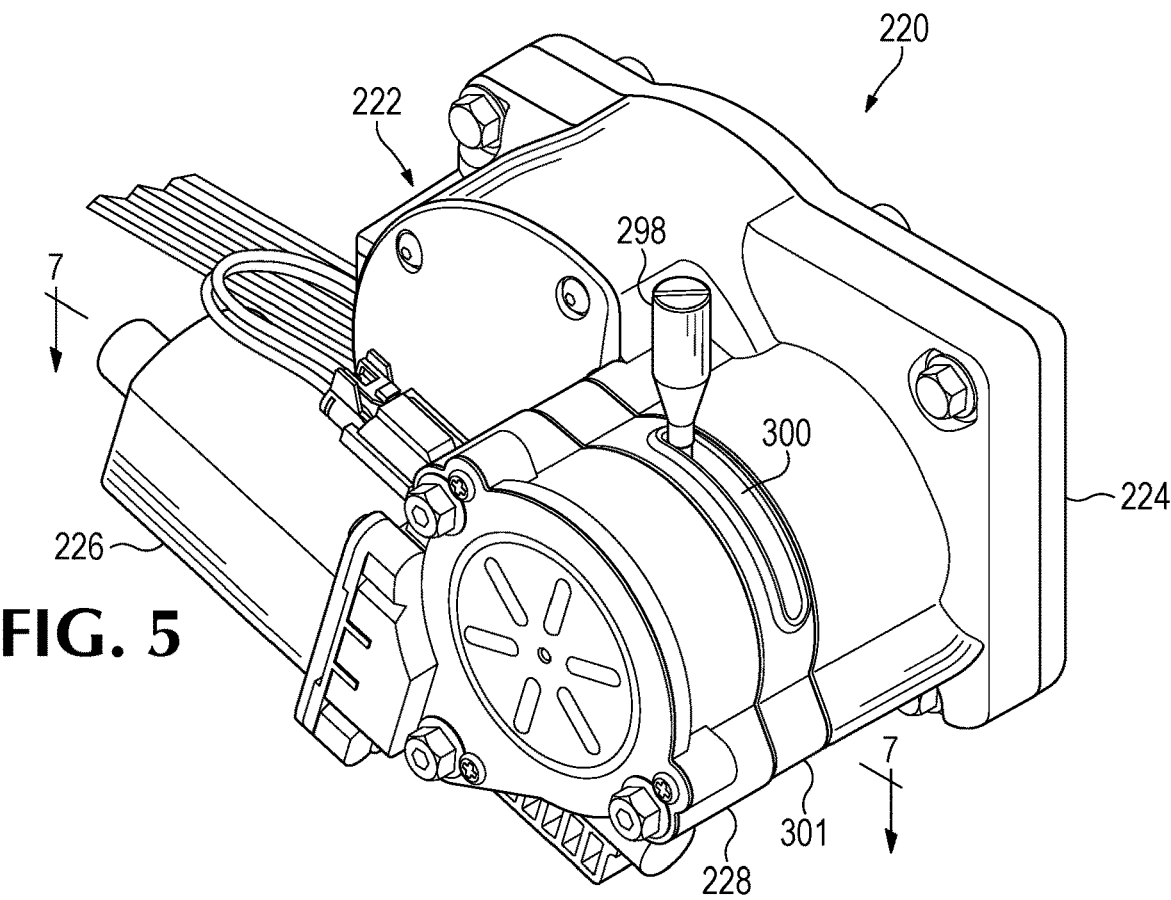
FIGS. 5-6 are isometric views of another example of a universal rotary actuator having a quick release assembly.
Figure 6:
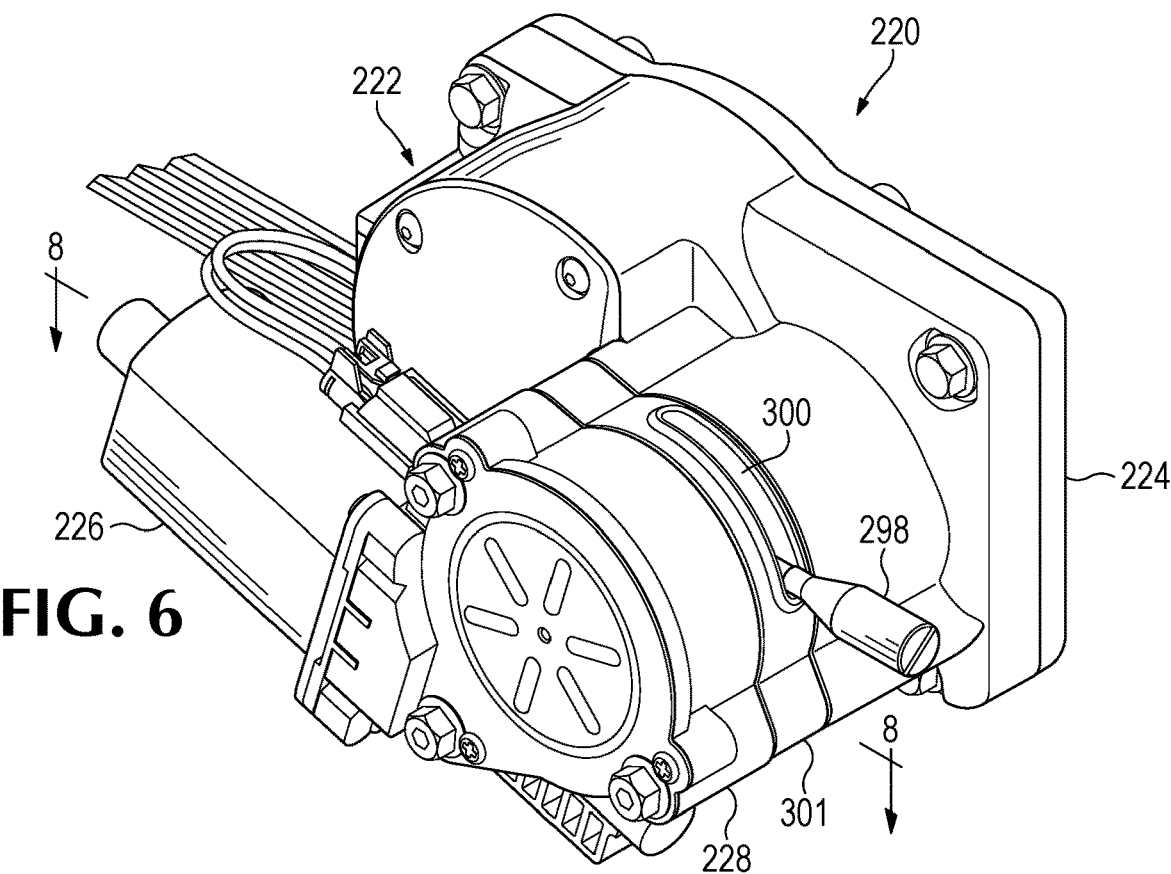
Figure 7:
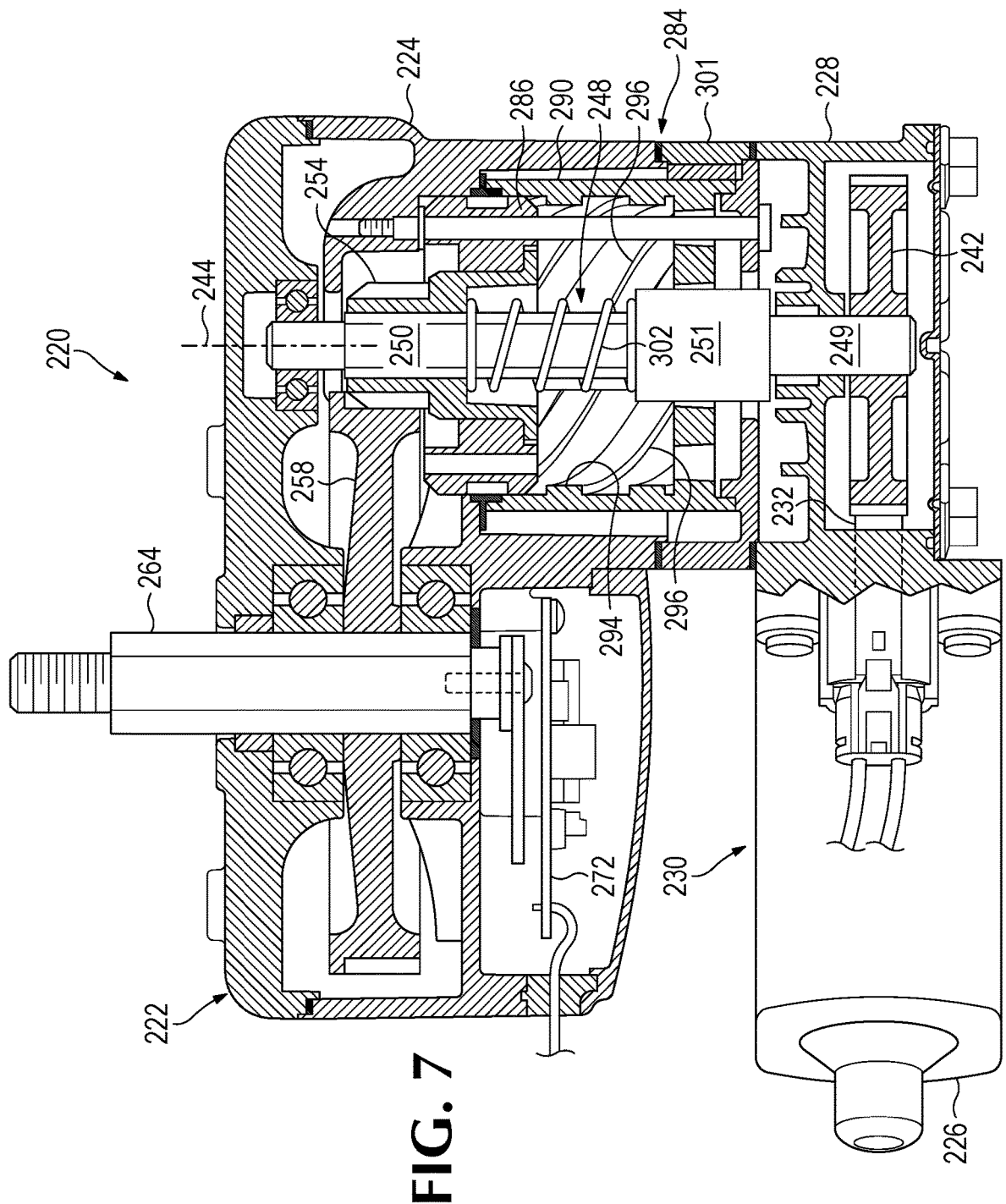
FIG. 7 is a sectional view of the universal rotary actuator of FIGS. 5-6 taken along lines 7-7 in FIG. 5, showing a pinion gear in an engaged position.
Figure 8:
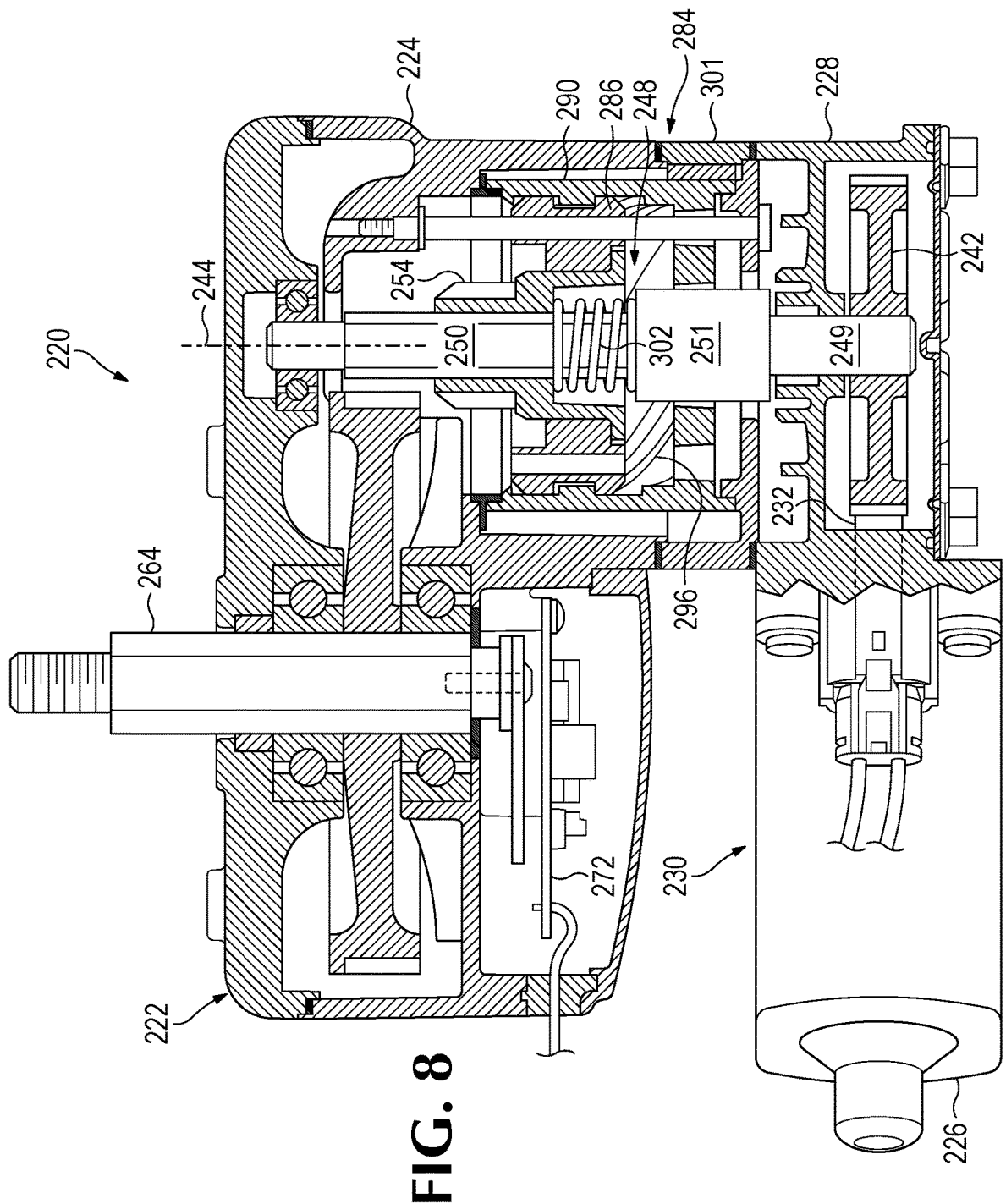
FIG. 8 is the sectional view of the universal rotary actuator of FIGS. 5-6 taken along lines 8-8 in FIG. 6, showing the pinion gear in a disengaged position.
Figure 9:
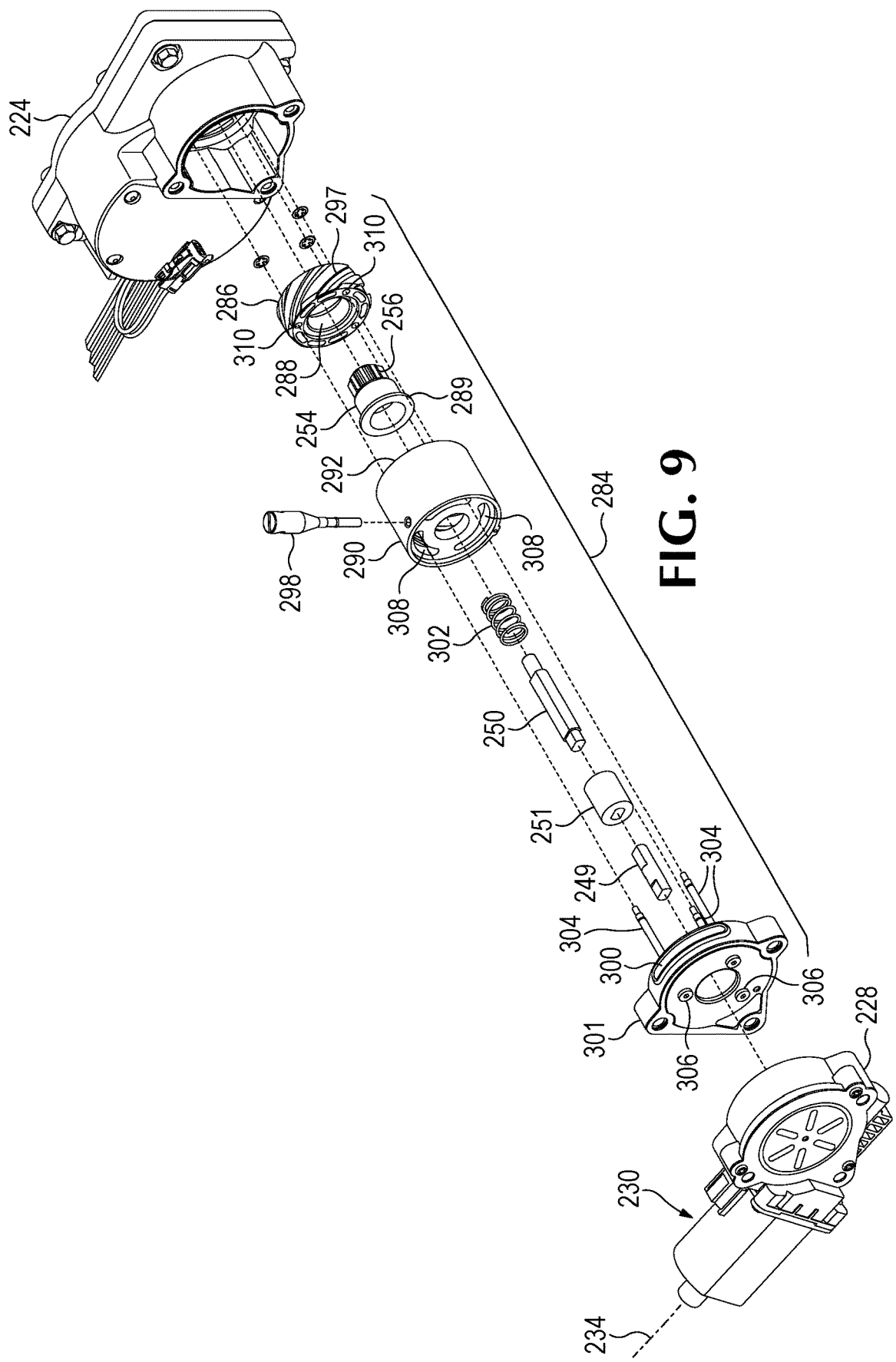
FIG. 9 is an exploded view of the quick release assembly of the universal rotary actuator of FIGS. 5-6.

Referring to FIGS. 1-4, an illustrative example of a universal rotary actuator (URA) 120 is shown. Unless explicitly excluded, URA 120 may include one or more components and/or one or more functions of other URAs described in the present disclosure. URA 120 includes a housing 122 that at least substantially or fully encloses or contains most of other components of the URA. Housing 122 include a base portion 124, a motor portion 126, and a gear portion 128, which are discrete components that are attachable or attached together. In other examples of URA 120, the base, motor, and/or gear portions of the housing may be formed together.

Motor portion 126 contains a motor 130 having a drive shaft 132 that rotates about a shaft rotational axis 134. Gear portion 128 contains a worm gear 136 having a longitudinal end 138 fixedly attached to drive shaft 132 such that the worm gear rotates about the shaft rotational axis. In other words, drive shaft 132 and worm gear 136 are co-axial. Motor 130 thus selectively rotates drive shaft 132 and worm gear 136. Worm gear 136 includes a plurality of threads 140. Gear portion 128 also contains a worm wheel 142 that is rotatably attached to gear portion 128 and rotates about a wheel rotational axis 144. In the example shown in FIGS. 1-4, wheel rotational axis 144 is perpendicular to shaft rotational axis. Worm wheel 142 includes a plurality of worm teeth 146 and is positioned adjacent to worm gear 136 such that worm teeth 146 meshes or engages with threads 140 of worm gear 136. Gear portion 128 includes separate compartments for each of the worm gear and the worm wheel with a slot 147 between those compartments to allow worm teeth 146 to engage with threads 140 of worm gear 136.

A wheel shaft assembly 148 includes a wheel portion 149, a pinion portion 150, and a connector 151 disposed between the wheel and pinion portions and connecting those portions. Wheel portion 149 is contained within gear portion 128 and is attached or fixedly attached to worm wheel 142 such that wheel shaft assembly rotates about the wheel rotational axis when worm wheel 142 rotates about that axis. Base portion 124 contains a pinion gear 154 that is attached or fixedly attached to pinion portion 150 of wheel shaft 148 such that the pinion gear rotates about wheel rotational axis 144. Pinion gear 154 includes a plurality of pinion teeth 156. Base portion 124 further contains a drive gear 158 that is rotatably attached to the base portion and rotates about a drive rotational axis 160 that is parallel to wheel rotational axis 144. The drive gear includes a plurality of drive teeth 162 and is positioned adjacent to pinion gear 154 such that pinion teeth 156 meshes or engages with drive teeth 162 of drive gear 158.

An output shaft 164 includes opposed longitudinal end portions 166 and 168. End portion 166 of output shaft 164 is attached or fixedly attached to drive gear 158 such that the output shaft rotates about wheel rotation axis 144 when the drive gear rotates. In the example shown in FIGS. 1-4, magnet control arms 170 are attached or fixedly attached to end portion 166 of output shaft 164 such that the magnet control arms rotate about wheel rotation axis 144 when the output shaft rotates. Although two magnet control arms 170 are shown, URA 120 may include one, three, or more magnet control arms. The magnet control arms each include at least one magnet 171 that can be detected by one or more magnet sensors of the controller assembly, as further discussed below. A substantial portion of output shaft 164 is external or outside base portion 124 and housing 122. End portion 168 may be attached to one or more link arms and/or other output components.

A controller assembly 172 is contained within and attached or fixedly attached to base portion 124. The controller assembly is disposed between motor 130 and drive gear 158. Controller assembly 172 includes one or more controllers 174 that selectively control one or more parameters of motor 130, such as direction and/or speed of motor 130. Controller assembly 172 additionally includes one or more magnet sensors 176 that each detect when a magnet control arm 170 is adjacent or proximate to the magnet sensor. Examples of suitable magnet sensors 176 includes reed switches, proximity switches, Hall effect omnipolar switches, etc. In the example shown in FIGS. 1-4, magnet control arms 170 are disposed between drive gear 158 and controller assembly 172. A magnet sensor 176 detects a magnet control arm 170 only when the magnet sensor and the magnet control arm are adjacent to each other or along the same axis that is parallel to wheel rotational axis 144.

In the example shown in FIGS. 1-4, magnet control arms 170 includes a first magnet control arm 178 and a second magnet control arm 180 that is offset from the first magnet control arm at a predetermined offset angle (e.g., 60 degrees) to provide the controller with additional inputs for controlling the motor. Additionally, magnet sensors 176 may be positioned at the ends of a predetermined angle of rotation for magnet control arms 170. For example, if the predetermined angle of rotation for first and second magnet control arms 178 and 180 (which corresponds to the desired rotation of the output shaft) is 180 degrees, then the magnet sensors are positioned such that (1) one of the magnet sensors and the first or second magnet control arm are adjacent to each other or along the same axis that is parallel to wheel rotational axis 144 when the first or second magnet control arm is at starting point (e.g., 0 degrees) allowing that magnet sensor to detect the first or second magnet control arm at the starting point, and (2) another of the magnet sensors and the first or second magnet control arm are adjacent to each other or along the same axis that is parallel to wheel rotational axis 144 when the first or second magnet control arm has moved 180 degrees from the starting point allowing that magnet sensor to detect the first or second magnet control arm after it has moved 180 degrees.

Additionally, controller assembly 172 includes one or more current sensors 182 that detect the current draw of motor 130. In some examples, there may be one or more current sensors 182 for each rotational direction of motor 130. Examples of suitable current sensors 182 include fine tuning potentiometers, built-in limit current potentiometers, remote limit current potentiometers, built-in limit current resistors, etc. In one example, current sensors 182 include a pair of adjustable fine tuning potentiometers and a pair of larger range adjustable potentiometers for larger adjustment (or fixed resistors).

Controller(s) 174 selectively control direction, speed, and/or other parameters of motor 130 based on input from magnet sensors 176 and/or current sensors 182. For example, controller may stop motor 130 (or decrease speed of the motor to zero) when a magnet sensor 176 detects a magnet control arm 170. Alternatively, controller(s) 174 decrease speed of motor 130 (e.g., 50% to 99% of original speed) when a magnet control arm 170 is detected by a magnet sensor and then stops the motor when the same magnet control arm is detected by another magnet sensor and/or another magnet control arm is detected by the same magnet sensor. The percentage speed reduction may be selectable by a user. Additionally, controller(s) may stop motor 130 when a current sensor 182 detects a current draw of the motor that exceeds a predetermined maximum current draw (e.g., 50 A), and/or may reverse direction of motor 130 for a predetermined time (e.g., 0.5 seconds) before stopping the motor. Reversing the motor is particularly significant in alleviating an obstruction, particularly when the obstruction caused the current draw of the motor to exceed the predetermined maximum current draw.

Referring to FIGS. 5-9, another example of URA 120 is shown and is generally depicted at 220. Unless explicitly excluded, URA 220 may include one or more components and/or one or more functions of other URAs in the present disclosure, such as URA 120. URA 220 includes many of the same or similar components as URA 120. Components of URA 220 labeled 2XX are the same as or similar to components in URA 120 labeled 1XX. For example, URA 220 includes a motor 230 having a drive shaft 232 that rotates about a shaft rotational axis 234, which is the same or similar to motor 130 having drive shaft 132 that rotates about shaft rotational axis 134 of URA 120.

Unlike URA 120, URA 220 includes a quick release assembly 284 that selectively moves pinion gear 254 from an engaged position (see FIG. 7) in which pinion gear 254 is adjacent to drive gear 258 such that the teeth of the pinion gear meshes and/or engages with the teeth of the drive gear to a disengaged position (see FIG. 8) in which the pinion gear is spaced from the drive gear such that the teeth of the pinion gear is spaced from (does not mesh or engage with) the teeth of the drive gear. Additionally, quick release assembly 284 selectively allows pinion gear 254 to move from the disengaged position toward the engaged position. In the example shown in FIGS. 5-9, pinion gear 258 is moved along wheel rotational axis 244 in the disengaged position relative to the engaged position. Unlike URA 120, pinion gear 254 is slidably connected to wheel shaft 248 allowing the pinion gear to move between the engaged and disengaged positions.

Quick release assembly 284 additionally includes a pinion lifter 286 having a lifter opening 288 that receives pinion gear 254 such that the pinion gear can be lifted or moved along wheel rotational axis 244 away from drive gear 258. Pinion gear 254 includes a flange portion 289 that is larger than lifter opening 288 to allow the pinion lifter to lift or raise the pinion gear and maintain the pinion gear in the disengaged position. However, pinion gear 254 can freely rotate within pinion lifter 286. Additionally, when pinion lifter 286 is lowered, the pinion gear is allowed to move back to the engaged position, such as via a spring as discussed below. The pinion gear may initially not return to the engaged position if the pinion teeth are misaligned with the gear teeth of the drive gear but will move to the engaged position when the pinion teeth and the gear teeth re-align or mesh.

A lead ring 290 having a lead opening 292 receives pinion lifter 286 and is rotatably attached to housing 222. Internal surface 294 of lead ring 290 (which forms the lead opening) includes a plurality of internal tracks 296. Pinion lifter 286 includes external tracks 297 (or tracks on the external wall of the pinion lifter) that correspond with internal tracks 296 of lead ring 290. The internal tracks of lead ring 290 and the external tracks of pinion lifter 286 allow the pinion lifter to be raised or lowered relative to the lead ring when the lead ring is rotated clockwise or counter-clockwise.

A lever 298 is attached or fixedly attached to lead ring 290, is rotatably or pivotably connected to housing 220, and is at least partially external the housing. In the example shown in FIGS. 5-9, lever 298 extends out of a slot 300 of a quick release portion 301 of housing 222 to allow a user to access the lever from external the housing. Lead ring 290 also is rotatably attached to quick release portion 301. A spring 302 is received in wheel shaft 248 and urges pinion gear 254 toward the engaged position and/or toward drive gear 258. In other examples, spring 302 may alternatively, or additionally, urge pinion gear 254 in the disengaged position. Moving lever 298 rotates lead ring 290 to move pinion lifter 286 and pinion gear 258 between the engaged and disengaged positions. When a user moves the pinion gear from the engaged position to the disengaged position via the lever, that movement is against the urging of spring 302. In some examples, a locking mechanism (not shown) may lock or secure lever 298 to the position that corresponds to when the pinion gear is in the disengaged position. Pins 304 are received in holes 306 of quick release portion 301, corresponding elongate slots 308 of lead ring 290, and corresponding holes 310 of pinion lifter 286 to prevent rotation of the pinion lifter relative to the lead ring but allow rotation of lead ring 290 relative to quick release portion 301.

Figure 10:
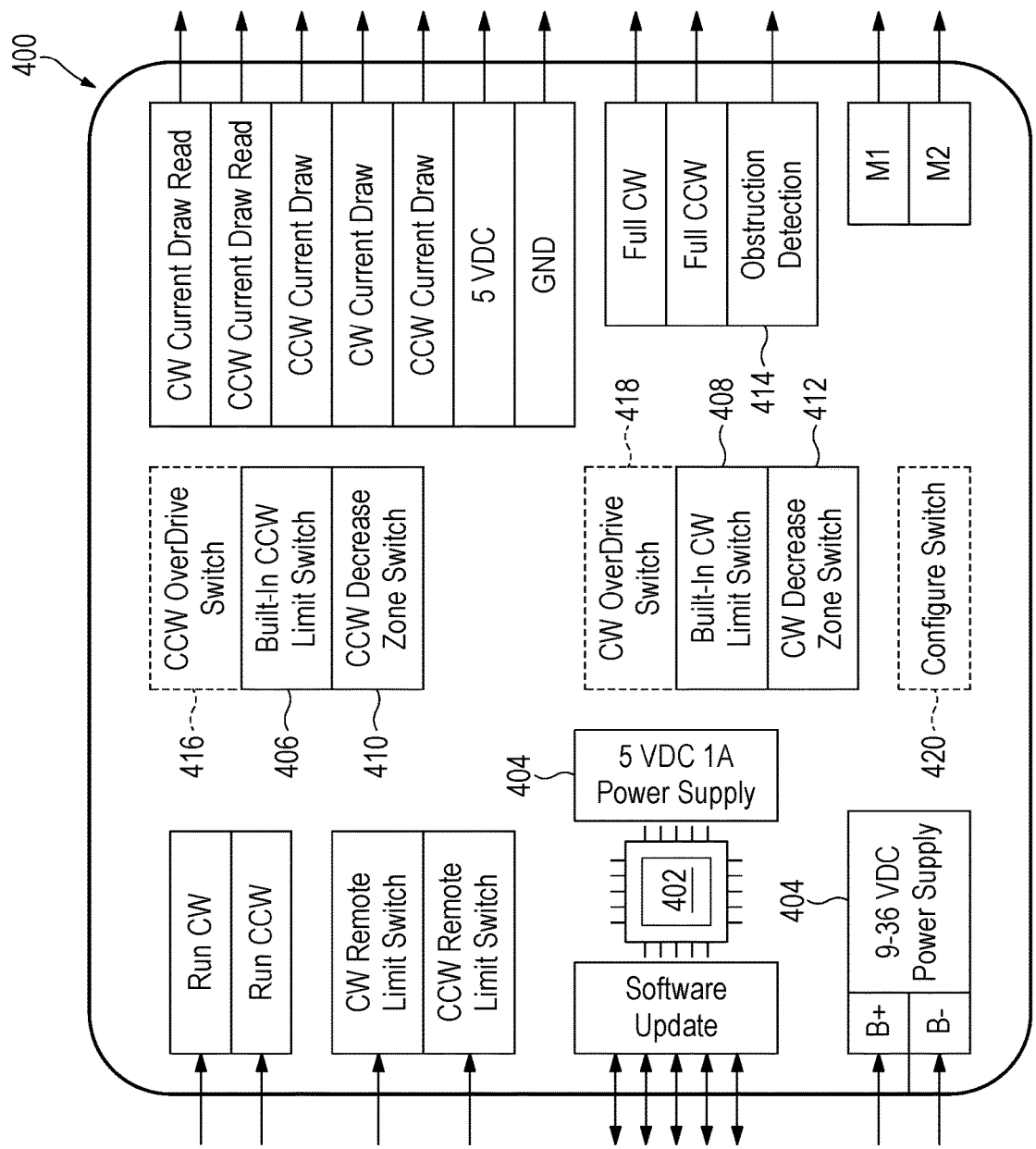
FIG. 10 is a block diagram of a controller for the universal rotary actuator of FIGS. 1-2 and/or 5-6.

Referring to FIG. 10, an example of a controller assembly for one or more of the URAs of the present disclosure is generally indicated at 400. The controller assembly includes a controller or processor 402, one or more power supplies 404, built-in limit switches 406 and 408 (e.g., magnet sensors) for counter-clockwise (CCW) and clockwise (CW) directions, decrease zone switches 410 and 412 (e.g., magnet sensors) for the CCW and CW directions, and an obstruction detection component 414. Built-in limit switches 406 and 408 may have 180 degrees of separation, while decrease zone switches 410 and 412 are located, for example, 14 degrees inward of limit switches 406 and 408. In one example, controller 402 may decrease motor speed when either decrease zone switch 410 or 412 is activated, and may stop the motor when either limit switch 406 or 408 is activated. Obstruction detection component 414 may include a current or current draw sensor that detects when the current draw of the motor is above a predetermined threshold, such as a predetermined maximum current draw threshold. Other optional components of controller assembly 400 include overdrive switches 416 and 418 for the CCW and CW directions and a configure switch 420.

Figure 13:
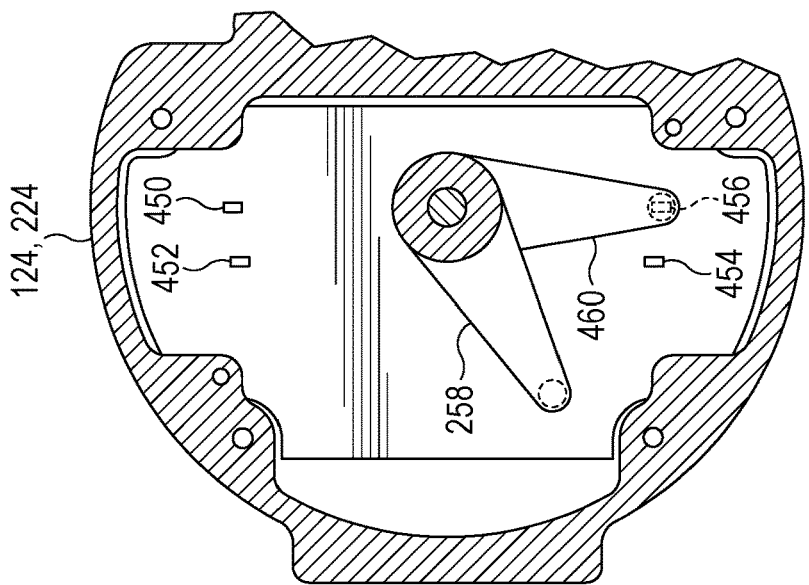
FIGS. 11-13 are sectional views of the universal rotary actuator of FIGS. 1-2 and/or 5-6 taken along lines 11-11 in FIG. 3, showing an example of sensors and magnet control arms.
Figure 12:
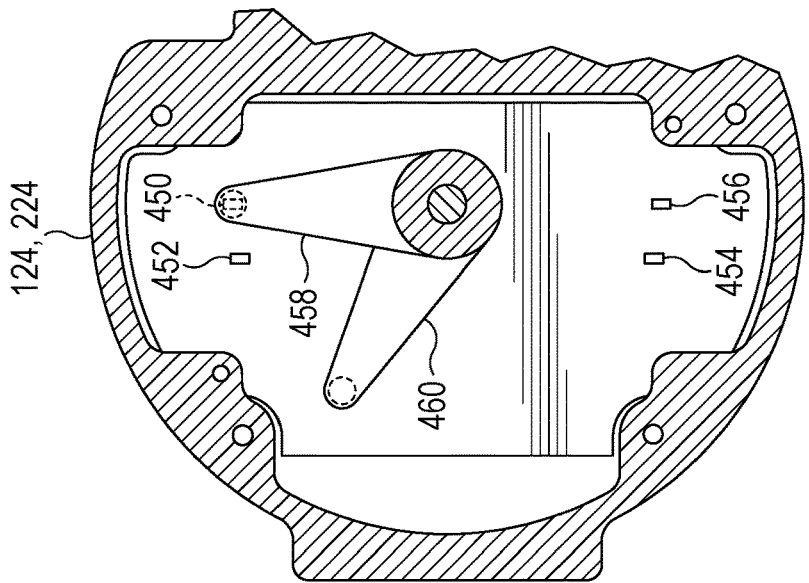
Figure 11:
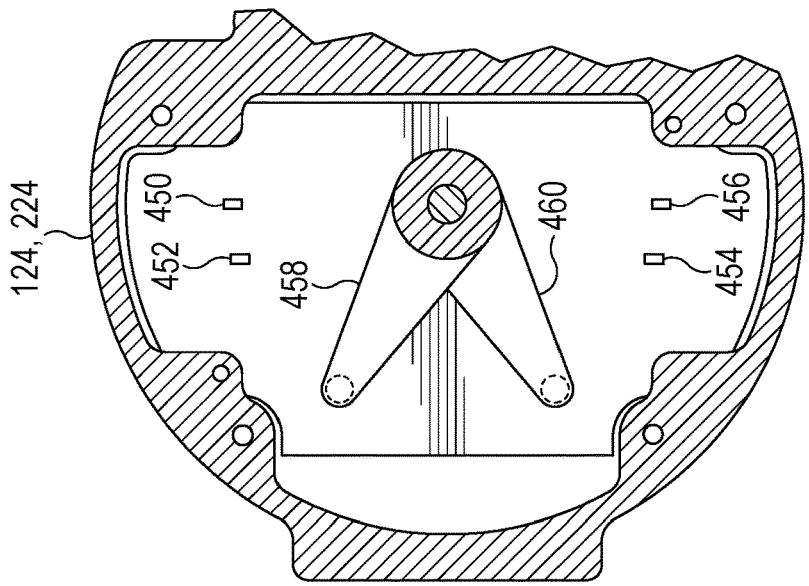

Referring to FIGS. 11-13, an example of a controller assembly of a URA of the present disclosure selectively controlling a motor based on magnet sensors 450, 452, 454, and 456 and first and second magnet control arms 458 and 460. In the example shown in FIGS. 11-13, second magnet control arm 460 is offset from magnet control arm 458 by 60 degrees. In FIG. 11, neither magnet control arm is adjacent to any of magnet sensors 450, 452, 454, and 456. Movement of the motor in the CCW direction moves the magnet control arms toward the position in FIG. 12. Prior to reaching the positions of the magnet control arms shown in FIG. 12, first magnet control arm 458 becomes adjacent to magnet sensor 452 (allowing magnet sensor 452 to detect first magnet control arm 458) and the controller may decrease the speed of the motor. When first magnet control arm 458 reaches the position in FIG. 12, first magnet control arm 458 is adjacent to magnet sensor 450 (allowing magnet sensor 450 to detect first magnet control arm 458) and the controller may stop the motor.

In contrast, movement of the motor in the CW direction from the position shown in FIG. 11, moves the magnet control arms toward the position in FIG. 13. Prior to reaching the positions of the magnet control arms shown in FIG. 13, second magnet control arm 460 becomes adjacent to magnet sensor 454 (allowing magnet sensor 454 to detect second magnet control arm 460) and the controller may decrease the speed of the motor. When second magnet control arm 460 reaches the position in FIG. 13, second magnet control arm 460 is adjacent to magnet sensor 456 (allowing magnet sensor 456 to detect second magnet control arm 460) and the controller may stop the motor. An angle of rotation of 120 degrees is shown in FIGS. 11-13. However, other examples of the URAs of the present disclosure may allow for lower or higher angles of rotation, such as 90 degrees, 180 degrees, etc. The magnet control arms and/or magnet sensors may be selectively positionable for the desired angles of rotations.

Figure 14:
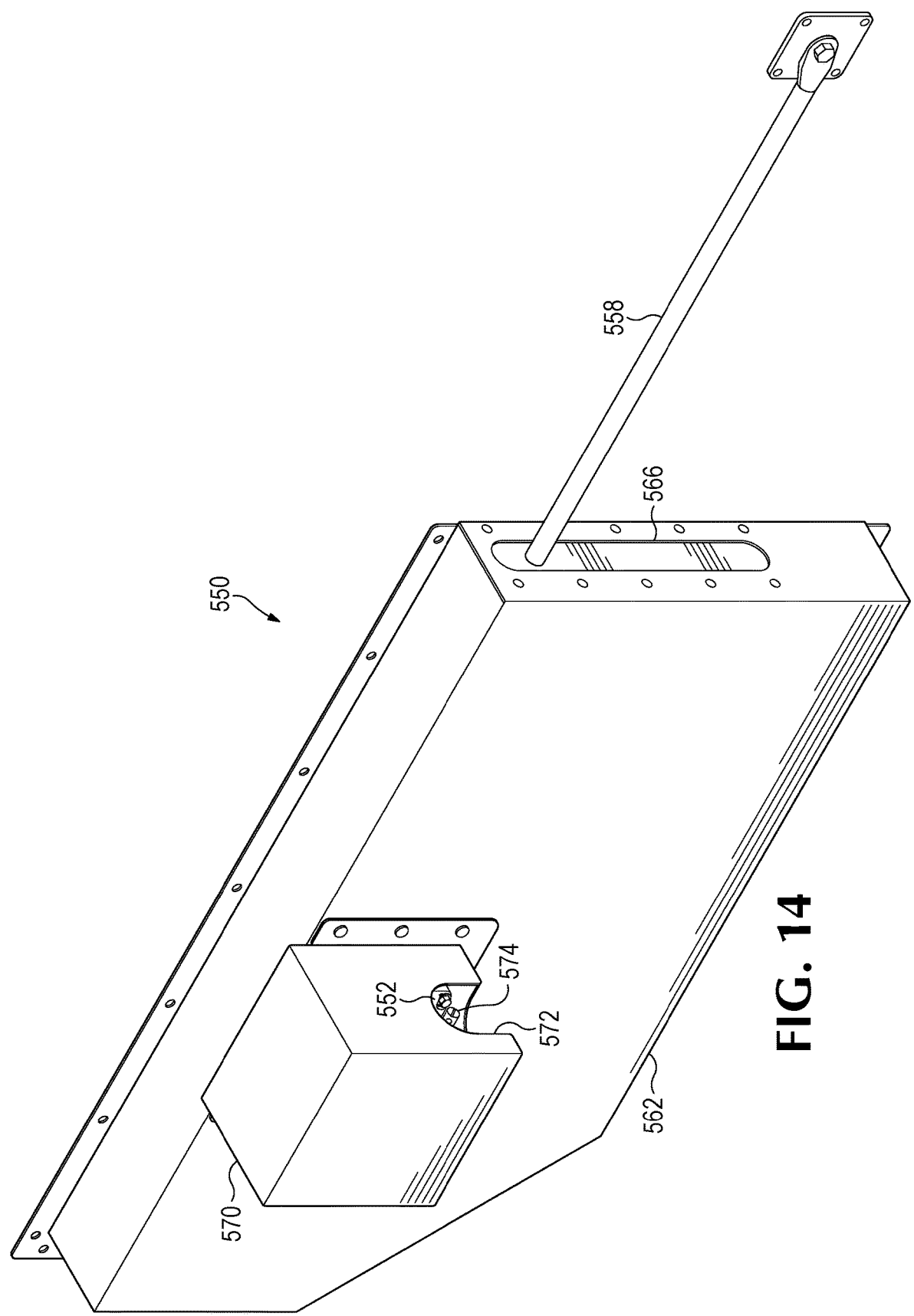
FIG. 14 is an isometric view of an example of a door assembly having the universal rotary actuator of FIGS. 1-2 and/or 5-6.
Figure 15:
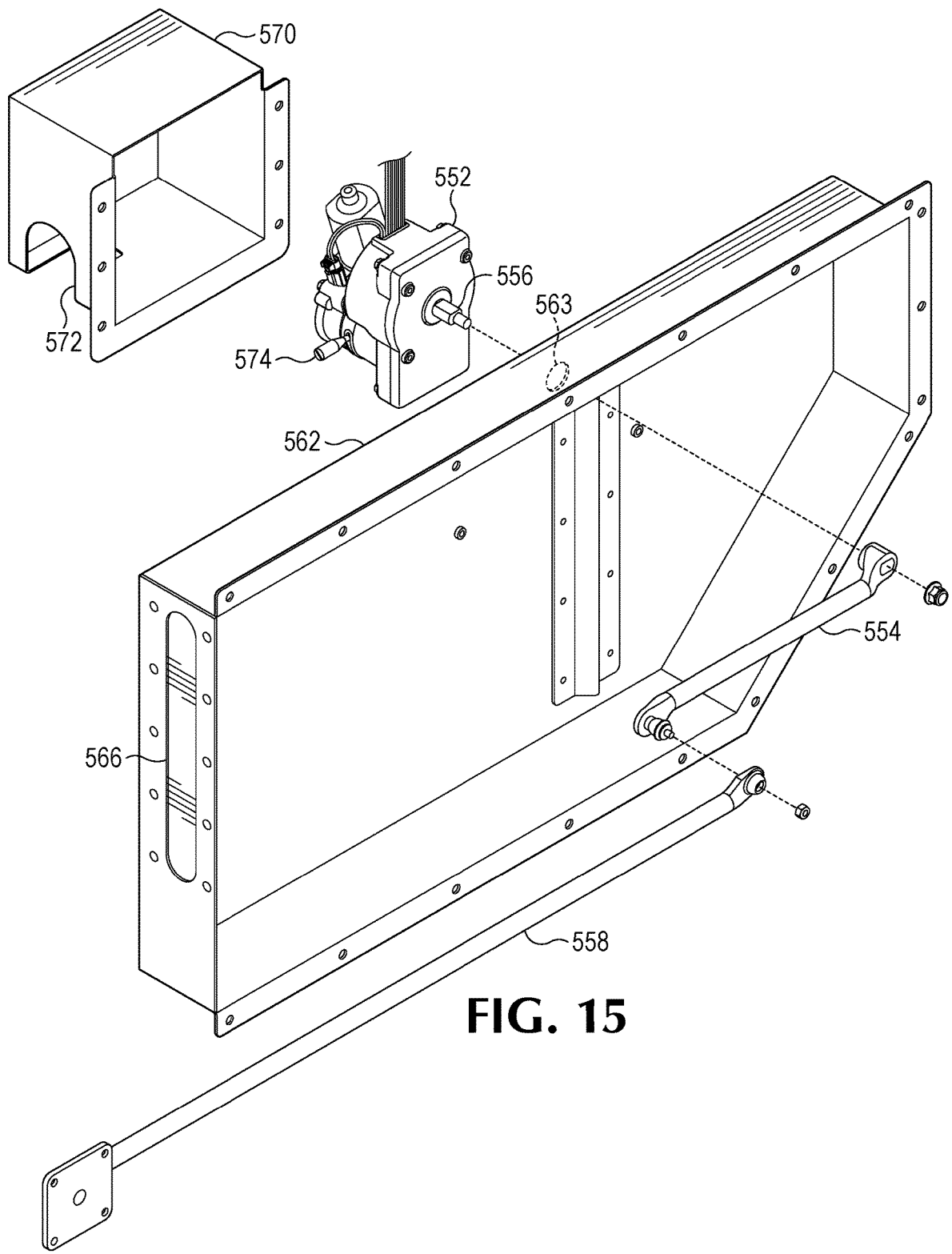
FIG. 15 is an exploded view of the door assembly of FIG. 14.

Referring to FIGS. 14-15, an example of a door assembly 550 is shown. Door assembly 550 includes a URA 552, a drive arm 554 rotatably connected to an output shaft 556 of the URA, and a follower arm 558 rotatably connected to the drive arm and a door 560. Door assembly 550 additionally includes a first housing 562. The first housing includes an opening 563 that receives output shaft 556 and completely encloses or contains output shaft 556 and drive arm 554 and partially encloses or contains follower arm 558. First housing 562 is attached or fixedly attached to a bulkhead and includes an elongate slot 566 through which follower arm 558 extends. The elongate slot is shaped to allow rotation of follower arm 558 as output shaft 556 and drive arm 554 rotates. URA 552 is attached to an external surface or wall 568 of first housing 562.

Door assembly 550 further includes a second housing 570 that is attached or fixedly attached to first housing 562 and at least substantially or completely encloses or contains URA 552. The second housing includes an access opening 572 that allows a user to access a quick release lever 574 of URA 552 from external the second housing. Second housing 570 additionally includes a wire opening (not shown) that allows wires and connector of URA 552 to extend out of the second housing.

Figure 16:
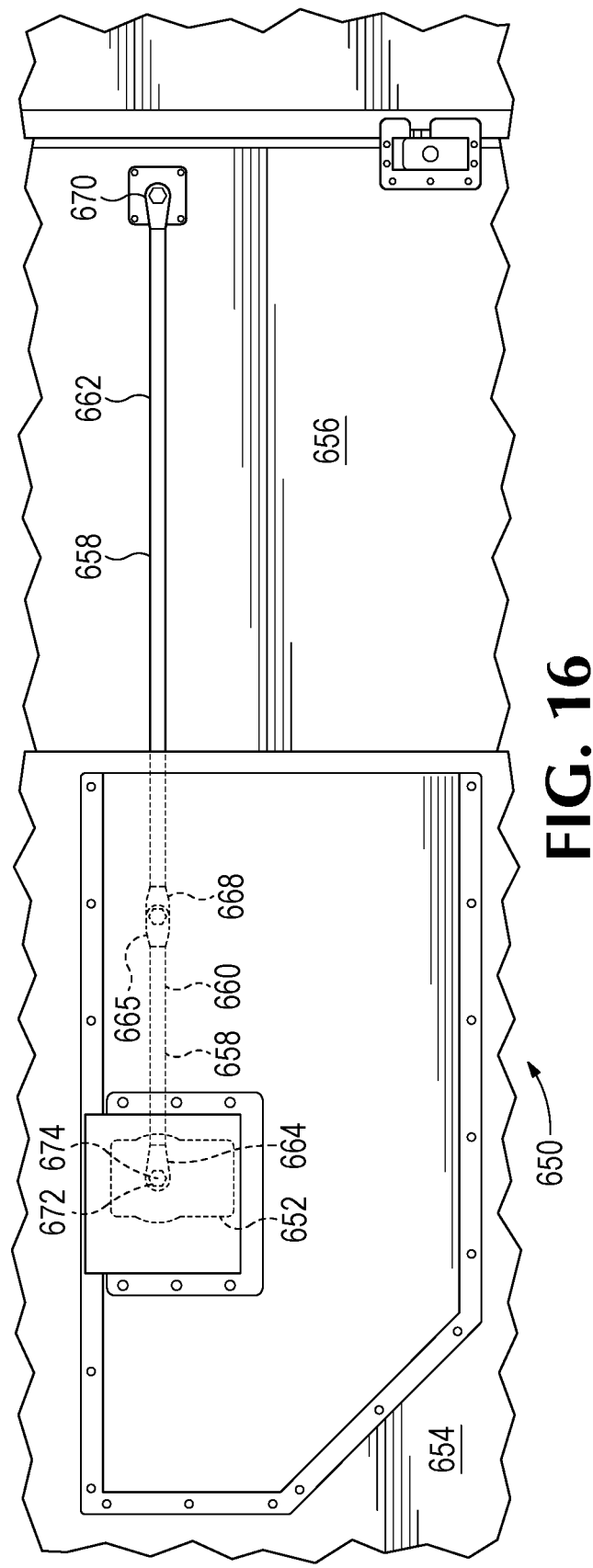

Referring to FIGS. 16-18, an example of door assembly 550 is shown, which is generally indicated at 650. Door assembly 650 includes a URA 652 (e.g., URA 120 or 220) attached or fixedly attached to a bulkhead 654 of a door 656. Door assembly 650 additionally includes link arms 658, which includes a first link arm or drive arm 660 and a second link or follower arm 662. First link arm 660 includes opposed longitudinal end portions 664 and 665, while second link arm 662 includes opposed longitudinal end portions 668 and 670. End portion 664 of first link arm 660 is attached to output shaft 672 of URA 652 such that the first link arm rotates with output shaft 672 about an output shaft axis 674. End portion 665 of first link arm 660 is rotatably or pivotably attached to end portion 668 of second link arm 662. End portion 670 of second link arm 662 is rotatably attached to door 656.

When the door is closed and the first and second link arms are in the fully extended position (see FIG. 16), those link arms are aligned with one another. Because of that alignment, any external application of force on the door (such as to open the door) would effectively compress the link arms resulting in no torque applied to the output shaft of the URA. Additionally, because the motor of URA 652 incorporates a worm gear that reduces the armature speed and transfer the axis of rotation by 90 degrees, applying torque to the worm gear would apply only a linear force along the axis of the worm gear and no such torque would be transferred to the worm gear resulting in no movement of the worm gear.

Therefore, the required force to open the door would need to exceed the force that would cause a failure in the components of the URA.

The URAs of the present disclosure provide several advantages over prior art actuators. For examples, the URAs of the present disclosure include smart electronic control that controls the motor. Additionally, the URAs of the present disclosure are compact to optimize space and its motor is strategically positioned to minimize footprint. For example, most or all of the internal components are along two parallel rotational axis with the controller assembly disposed between the motor and the drive gear. Moreover, the URAs of the present disclosure can detect obstructions and stop the motor through current sensing, and also include an optional disengagement mechanism to facilitate manual operation. Furthermore, the URAs of the present disclosure includes rotating shafts in ball bearings for durability and an output shaft the is sealed to prevent water/dust entry.

It will be appreciated that the invention is not restricted to the particular embodiment that has been described, and that variations may be made therein without departing from the scope of the invention as defined in the appending claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. Further, the reference numbers, design, and components in the figures are merely illustrative and may be subject to change. The word "comprise" or a derivative thereof, when used in a claim, is used in a nonexclusive sense that is not intended to exclude the presence of other elements or steps in a claimed structure or method.

What is claimed is:

1. A universal rotary actuator, comprising:
   a worm gear having a plurality of threads and having a first rotational axis;
   a motor attached to the worm gear and adapted to selectively rotate the worm gear;
   a worm wheel having a plurality of teeth that meshes with the plurality of threads and having a second rotational axis that is perpendicular to the first rotational axis;
   a first shaft having opposed longitudinal first and second end portions, the first end portion being attached to the worm wheel such that the first shaft rotates about the second rotational axis as the worm wheel rotates;
   a pinion gear attached to the second end portion and having a plurality of teeth, the pinion gear rotating about the second rotational axis;
   a drive gear having a plurality of teeth that meshes with the plurality of teeth of the pinion gear and having a third rotational axis that is parallel to the second rotational axis;
   a second shaft attached to the drive gear such that the second shaft rotates about the third rotational axis as the drive gear rotates; and
   a controller disposed between the drive gear and the motor, the controller assembly selectively controlling direction and speed of the motor.

2. The actuator of claim 1, further comprising at least one magnet arm attached to the drive gear such that the at least one magnet arm rotates about the third rotational axis as the drive gear rotates, the at least one magnet arm being disposed between the drive gear and the controller assembly.

3. The actuator of claim 2, wherein the control assembly includes a controller and at least one magnet sensor that detects the at least one magnet arm, wherein the controller selectively controls direction and speed of the motor based on the at least one magnet sensor detecting the at least one magnet arm.

4. The actuator of claim 3, wherein the controller stops the motor in response to the at least one magnet arm being adjacent to the at least one magnet sensor.

5. The actuator of claim 3, wherein the at least one magnet sensor includes first and second magnet sensors, and wherein the controller stops the motor in response to the first magnet arm being adjacent to the at least one magnet sensor and in response to the second magnet arm being adjacent to the at least one magnet sensor, the first and second magnet sensors being positioned to allow rotation of the at least one magnet arm within a predetermined angle of rotation.

6. The actuator of claim 3, wherein the at least one magnet arm includes a first magnet arm and a second magnet arm offset from the first magnet arm.

7. The actuator of claim 6, wherein the controller decreases speed of the motor in response to the first magnet arm being adjacent to the at least one magnet sensor, and stops the motor in response to the second magnet arm being adjacent to the at least one magnet sensor.

8. The actuator of claim 1, further comprising at least one current sensor to detect current draw of the motor.

9. The actuator of claim 8, wherein the controller assembly stops the motor in response to the detected current draw of the motor exceeding a predetermined current draw.

10. The actuator of claim 9, wherein the controller assembly stops the motor and reverses direction of the motor for a predetermined time in response to the detected current draw of the motor exceeding the predetermined current draw.

11. The actuator of claim 1, further comprising a quick release assembly that selectively moves the pinion gear from an engaged position with the plurality of teeth of the drive gear, to a disengaged position spaced from the plurality of teeth of the drive gear relative to the engaged position.

12. The actuator of claim 11, further comprising at least one housing that at least substantially encloses the worm gear, the motor, the worm wheel, the first shaft, the pinion gear, the drive gear, and the controller assembly, wherein the quick release assembly includes a lever that is rotatably attached to the housing and that is at least partially external the at least one housing, the lever allowing a user to move the pinion gear between the engaged and disengaged positions.

13. The actuator of claim 11, wherein the quick release assembly includes at least one spring that urges the pinon gear toward the engaged position.

14. The actuator of claim 13, wherein the quick release assembly selectively allows the pinion gear to move from the disengaged position to the engaged position in response to urging from the spring.

15. The actuator of claim 13, wherein the quick release assembly includes a lever that allows a user to move the pinion gear from the engaged position to the disengaged position against the urging of the at least one spring.

16. A door assembly, comprising:
the universal rotary actuator of claim 1;
a first link arm having opposed longitudinal first and second ends, the first end being attached to the second shaft such that the first link arm rotates with the second shaft about the third rotational axis; and
a second link arm having opposed longitudinal third and fourth ends, the third end being rotatably attached to the second end such that the second link arm rotates about a fourth rotational axis that is parallel to the third rotational axis, and the fourth end rotatably attached to a door.

17. The door assembly of claim 16, further comprising a first housing that is attached to a bulkhead adjacent to the door and that encloses the first link arm and a portion of the second link arm, the first housing having an elongate slot that receives the second link arm and allows the second link arm to rotate.

18. The door assembly of claim 17, wherein the universal rotary actuator is attached to an external wall of the first housing, the first housing having an opening sized to receive the second shaft.

19. The door assembly of claim 18, further comprising a second housing that is attached to the first housing and that encloses at least a substantial portion of the universal rotary actuator.

20. The door assembly of claim 19, wherein the universal rotary actuator includes a quick release assembly that selectively moves the pinion gear between an engaged position in which the plurality of teeth of the pinion gear meshes with the plurality of teeth of the drive gear, and a disengaged position in which the plurality of teeth of the pinion gear is spaced from the plurality of teeth of the drive gear relative to the engaged position, and wherein the second housing includes an opening that allows a user to move the quick release assembly from the engaged position to the disengaged position from external the second housing.

21. The door assembly of claim 20, wherein the quick release assembly includes a lever allowing a user to move the pinion gear between the engaged and disengaged positions, and wherein the lever is accessible via the opening of the second housing.

* * * * *